United States Patent
Cotugno et al.

(10) Patent No.: US 6,742,086 B1
(45) Date of Patent: May 25, 2004

(54) AFFINITY CHECKING PROCESS FOR MULTIPLE PROCESSOR, MULTIPLE BUS OPTIMIZATION OF THROUGHPUT

(75) Inventors: Lauren Ann Cotugno, Dove Canyon, CA (US); Philip Douglas Wilson, Lake Forest, CA (US); Mark Douglas Whitener, Aliso Viejo, CA (US); Stephen Lane Billard, Huntington Beach, CA (US)

(73) Assignee: Unisys Corporation, Blue Bell, PA (US)

( * ) Notice: Subject to any disclaimer, the term of this patent is extended or adjusted under 35 U.S.C. 154(b) by 852 days.

(21) Appl. No.: 09/638,073

(22) Filed: Aug. 11, 2000

(51) Int. Cl.[7] .............................................. G06F 12/00
(52) U.S. Cl. ....................... 711/141; 711/122; 711/151; 711/154; 712/227; 718/105
(58) Field of Search ................. 711/118, 122, 711/134, 135, 141, 146, 147, 151, 194; 712/26, 227; 718/105; 714/11, 12

(56) References Cited

U.S. PATENT DOCUMENTS

| | | | | |
|---|---|---|---|---|
| 5,185,861 A | * | 2/1993 | Valencia ..................... | 711/120 |
| 5,826,079 A | * | 10/1998 | Boland et al. .............. | 718/102 |
| 5,950,228 A | * | 9/1999 | Scales et al. ................ | 711/148 |
| 6,269,390 B1 | * | 7/2001 | Boland ........................ | 718/100 |
| 6,457,107 B1 | * | 9/2002 | Wynn et al. ................. | 711/152 |
| 6,526,480 B1 | * | 2/2003 | Naruse et al. ............... | 711/144 |
| 6,591,355 B2 | * | 7/2003 | Schuster et al. ............. | 711/202 |
| 6,636,950 B1 | * | 10/2003 | Mithal et al. ................ | 711/147 |

OTHER PUBLICATIONS

Verma et al., "Implementation and Performance of Evaluation of Locust", © Aug. 10, 1998, Silicon Graphics Comput. Syst., p. 96 104.*

Tandri et al., "Automatic Partitioning of Data and Computations on Scalable Shared Memory Multiprocessors", © 1997 IEEE<p. 64–73.*

Hung et al., "Reduction of False Sharing by using Process Affinity in page–based Distributed Shared Memory Multiprocessor Systems", © 1996 IEEE, p. 383–390.*

* cited by examiner

*Primary Examiner*—Donald Sparks
*Assistant Examiner*—Brian R. Peugh
(74) *Attorney, Agent, or Firm*—Alfred W. Kozak; Mark T. Starr; Lise A. Rode

(57) ABSTRACT

A method is provided to establish affinity for each pair of processors with a specific processor bus which eliminates the need for cross-bus operations in cache invalidation operations. Each pair of processors in the network is exercised for elapsed time of cache update cycle completion. Those pairs having the minimal execution times are then selected for utilization of applications to be executed.

9 Claims, 4 Drawing Sheets

AFFINITY CHECKING PROCESS FOR MULTIPLE PROCESSOR, MULTIPLE BUS OPTIMIZATION OF THROUGHPUT

FIELD OF THE INVENTION

A method for developing the most appropriate affinity relationship between multiple processors which can be oriented to a particular one bus of multiple busses in order to optimize operations and throughput. A determination method is used to establish which processors are operating on which particular one of the multiple busses so that appropriate balancing can occur across the buses.

BACKGROUND OF THE INVENTION

On high-end multi-processor systems, there are generally provided a multiplicity of busses. In many cases there are at least two busses which are used by different groups or sets of processors. A problem often arises in that the operating system does not report or provide any indication of the particular system bus on which each particular processor resides for operation. This is important information when optimizing the utilization of the system for what is called affinity management, where it is necessary to determine or dictate which processor, or range of processors, a particular software application is allowed to use.

If one group of processors resides on one of the system busses, and another group of processors resides on another system bus, then there are quite considerable problems with cache coherency, since then cross-bus operations for invalidation of cache data are required which are time-consuming and which degrade the throughput. The most appropriate approach in these type of multiple bus, multiple processor systems is to perform a performance tuning which will balance the various applications across the system busses in a manner which will minimize the effects of caching overhead, especially for minimizing cross-bus traffic on cache invalidation operations. Balancing applications infers the minimizing of cross-bus cache invalidation overhead by placing applications for sharing of cached data onto processors that reside on the same system bus.

In the situations where multiple processors, each having first and second level cache units have certain processors residing on different busses, it is required that when a processor on one bus has initiated a cycle for cache memory invalidation, it is then necessary to crossover to the other bus to ensure that invalid data does not continue reside in the Central Processing Units on the other bus. This crossover operation is effectuated by Cache Coherency Boards.

In some platforms such as Windows NT, it is sometimes possible to set what is called the "affinity" by directing that a certain program or application only run, for example, on CPU 1 and 2, and this minimizes chances of requiring an invalidation cycle for cache units to run on different busses which then provides for superior performance.

However, another situation arises when for example, there may be 8 or 10 processors with multiple busses. In this situation, the "order" in which the CPU's come online is not the same as that of the processor's number ID. So, when looking at the operator screen, it is not possible to tell which processors are working on the same bus or another bus so that it is then difficult to execute an affinity operation.

Since there is no orderly numbering arrangement involved, and because of the way that the processors come online in an NT platform, the NT platform will number them in the order on which they initialize and come onto one of the busses.

In situations where there is only one system bus, for example, a four-processor system which has only one system bus, there is no requirement on how to set the affinities. However, if there are two busses involved working with different groups of processors, then it is necessary to cross from one, say the left side CPU bus to the right side CPU bus, and go through cache coherency boards and the chipset of the other bus which leads to much undesirable latency to complete cache invalidation operations.

The optimum situation is what is called a balancing across the busses, so there is a balance of operations between the loads provided on one bus, and the loads provided on the other bus by the operating processors.

Thus, a considerable problem arises in how is it possible to balance the load on the busses as against the operating processors, and also how to minimize the need for cross-bus invalidation operations and how to maximize the bandwidth of each of the busses.

In the NT platforms, the processors do not self-identify themselves according to the numbers involved. The Intel processors, for example, do not provide one with a CPU number and they do not indicate onto which bus a CPU will be operating in a multiple bus system. Thus, at any given period, it is not possible to know whether a particular processor is connecting its operations on the left side bus or the right side bus, and thus a question often arose, how do you tell if two particular processors are on the same system bus, or not?

Another type of problem often arises which is indicated when two Central Processing Units (CPU's) are sharing the same data. In this case, there is required an operation whereby the system has to go back and forth on different busses to operate the caches in the various different CPU's working on the various different busses involved. If the memory arrays are coded so that the data is being shared by the processors, the latency times for cache invalidation is worse if there are two separate busses involved. Then, this requires a cache invalidation operation over to a cache coherency board thus to find that the data (to be invalidated) is over on the other side of this bus and the invalidation data must be transferred to the other bus.

It may be noted that if there is no balancing of loads across the multiple busses there is thus a lack of affinity in the multi-processor, multi-bus system, then there could be a degradation in performance of 20% to 30% because of the need to cross the CPU operations from one bus onto the other bus. However, if two CPU's are on the same bus, then this is an "affinity" type of operation and the throughput and cache invalidation operations will be 20% to 30% better.

Another occasion when the problem arises, is that each time the system is rebooted or re-initialized, the processors would come and connect-up in a different numbered order so that one group of processors would be connected to one bus, and another group of processors would be connected to another bus, but there was no indication to the operator or user of this system as to which processor would be operating with which bus at that particular time after the rebooting.

Thus, it is a very desirable thing for optimization of system operations, that there be set-up a method for creating a "mapping" of the processor and busses on the system so that then certain operations with a certain group of processors can be relegated to one bus and other groups of operations and processors can be relegated to operations on the other bus which then provides for a tuning and balancing of loads in the system without undue interference of one bus with the other bus.

SUMMARY OF THE INVENTION:

There is provided herein a method to determine which processors reside on the very same system bus in multi-processor systems having more than one system bus. As a result of this, it is then possible to "affiniti" or operate the system applications in a more efficient manner by causing operations of one set of applications to operate on processors residing on one system bus, and the operations of other sets of applications to operate on another set of processors residing on a second system bus. This will provide for minimization of cross-bus invalidation traffic, thus to produce latency of operations and also to provide for greater throughput by greater efficiency of usage of each processor set.

The method takes advantage of the concept known as "false sharing", which is used to determine where each of the processors reside (i.e., on the first bus or the second bus). False sharing involves a situation where each of the processors have two caches L1 and L2, and where the L2 cache is shared by the data in the L1 cache. Then two separate threads can be made to execute on two selected different processors while the system is accessing and updating data in the same arrays at the same time. From this, the time spent performing this operation is noted and recorded for each and every one of all possible combinations of pairs of processors on each of the system busses.

Once the throughput timings are collected for all possible processor combinations and the data is analyzed, then the various affinity connections and system bus split operations become obvious, since there will be seen to be a very large performance penalty in certain cases where the pair of processors reside on different system busses, while in cases where the pair of processors reside on the same system bus, there will be a highly efficient throughput. At this stage it is now possible to know which particular CPU's are operating on which particular one of the busses.

GLOSSARY LIST OF RELEVANT ITEMS

Figure 1:
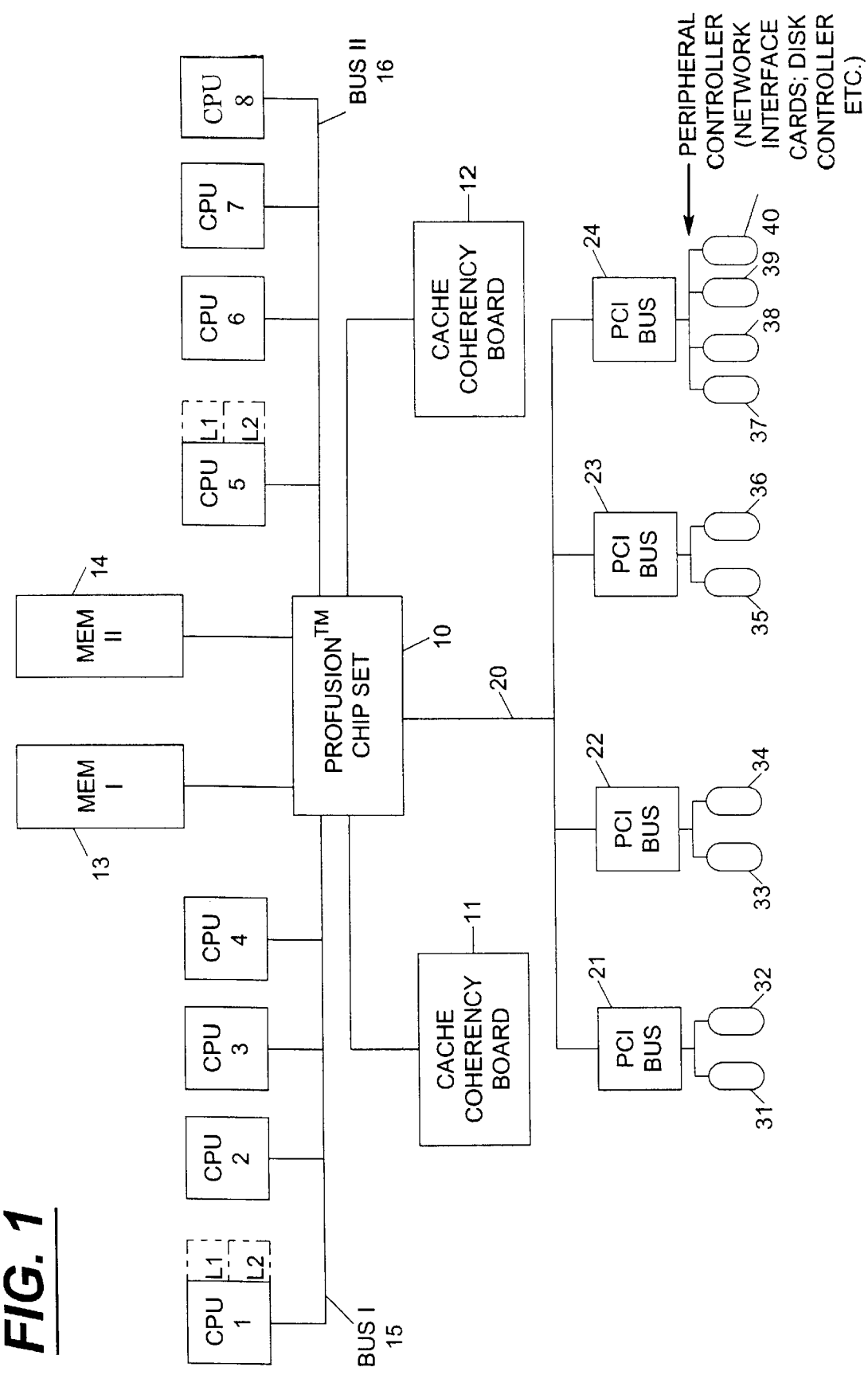
FIG. 1 is a generalized overall diagram showing a network of multiple processors and which are grouped into sets operating on different bus systems.

AFFINITY: In this context, Affinity is the propensity of a thread to return to the CPU upon which it previously executed when it returns after a previous execution time has expired. See "THREAD MIGRATION".

AFFINITY MANAGEMENT: This is the process of specifying upon which processor or group of processors an individual thread can execute its operations.

AFFINITY MASK: An array in memory containing a list of valid CPU numbers for a given thread. Valid CPU numbers identify those CPU's upon which the thread will be allowed to execute.

AFFINITY TOOL: This is the same reference as the Process Manager which is a Unisys Corporation tool for providing user-friendly methods for managing Affinity.

ARRAYS: This refers to groups of data organized together in memory.

ATOMIC OPERATIONS: This involves a situation where two operations are occurring simultaneously, that is to say in the same CPU clock cycle.

CACHE COHERENCY BOARD: This is a name for certain cards or boards on an 8-way system that monitors data in the system cache of the active processors on the system. This name was developed by the Intel Corporation, of Santa Clara, California. These boards track the information in all of the central processing unit's caches in order to determine if the cache of a CPU needs to be invalidated because a different one of the central processing units (CPU) is updating information residing in that cache.

CACHE INVALIDATION CYCLE: A sequence wherein, when data is overwritten and invalidated, a signal is sent to all cache units having that data, to be marked as invalid (unusable) data. When this signal must crossover from one bus to another bus, this will slow down processor operations.

CACHE LINE INTERLEAVED: The cache lines on a memory subsystem that contain two separate memory cards which cache lines may then be evenly allocated across the two memory cards for added performance.

CMP (CELLULAR MULTIPLE PROCESSOR): This is a Unisys Corporation platform which has cellular group divisions which provide NT, UNIX and MCP (Master Control Programs of Unisys) for access in execution of programs.

CODING OF ARRAYS: This relates to programs or codes written to manipulate data in memory.

CONTEXT SWITCHING: This involves having a processor stop executing one particular thread in order to execute another thread on the same system.

ES PROCESS: See "PROCESS MANAGER".

FALSE SHARING: This describes a concept where data is not shared in the various caches, but the data can be present in a local cache on more than one central processing unit (CPU) because of how the data was declared to the computer program.

HEAP: This is an array in memory which is used for storing data.

INTEL PROFUSION CHIP SET®: This is the name given to the set of chips which are placed in between the multiple buses on the system. The system is seen to contain two separate CPU buses, two separate memory buses for the memory cards, and a bus dedicated as an I/O bus, and two optional cache coherency cards. All of these cards are attached to the Profusion™ Chip Set. Profusion™ is a trademark of Corollary Inc., 2802 Kelvin Avenue, Irvine, Calif. 92714.

KERNEL SYNCHRONIZATION OBJECTS: These are units used to control the synchronization of threads on different processes. These would include events, semaphores, and mutexes. These are a subset of Kernel Objects, which includes files, threads, processes, job objects, etc.

LOCKS: This is a protection and synchronization method for structures and threads. When used, they ensure that any updates or processing cannot occur in parallel or out of order.

MUTEX: This is a method of synchronization for threads, that allows one thread mutually exclusive access to a resource, where other threads cannot access the resource, and will therefore wait for it, until the current thread is finished with the resource. A mutex object is an interprocess synchronization object whose state is set to—signaled—when it is not owned by any thread, and set to—nonsignaled—when it is owned. Only one thread at a time can own a mutex object.

NETWORK INTERFACE CARD: This is a hardware card that is connected to a system to allow it to interface to a network for the purpose of sending transactions to and from other systems by communicating with other systems.

P6 BUS: This is the type of current system bus used on Intel-based systems. This provides the path along which up to four central processing units (CPU's) can reside and execute their operations. Data flows to and from the various central processing units (CPUs) along this path.

PCI BUS: This is the input/output bus on this system. Peripheral units, such as disk or tape, will transport their data into main memory along this path.

PERFORMANCE TUNING: This is the process of locating performance bottlenecks in applications and removing these bottlenecks. This involves an iterative process of making an application perform with greater efficiency.

PROCESSOR AFFINITY: An organized setting which controls which particular CPU a process (software) will be allowed to execute on.

PROCESS MANAGER: A Unisys Corporation tool which provides a user-friendly method for managing Affinity.

SEMAPHORES: A semaphore is a hardware or software flag used to indicate the status of some activity.

SINGLE CACHE LINE FETCH: This is the amount of data moved from the main memory to the CPU's cache in a single transaction or a single fetch.

THREAD: A unit of execution that runs machine instructions. Each individual process has at least one thread.

THREAD COMPLETION: This is a situation indicated when a thread completes its execution and then terminates.

THREAD MIGRATION: Thread migration is the term for a process that occurs when a thread first executes on one CPU then gets removed from that CPU when its execution time expires, and then returns to the same process on a CPU other than the previous CPU.

DESCRIPTION OF PREFERRED EMBODIMENT

The environment presented which utilizes the affinity checking process for multiple bus optimization and throughput is illustrated in one example of FIG. 1.

A set of central processing units CPU's 1, 2, 3, 4 is connected to a first bus 15 (bus I) which is in communication with a Profusion™ chip set 10.

A second group of processors, central processing units (CPU's) 5, 6, 7, and 8, are connected for operation on a second bus 16 (bus II) which also connects to the Profusion™ chip set 10. Each processor (CPU) will have a first (L1) and second (L2) level cache which is illustrated by the dotted blocks L1 and L2 to indicate that each processor has a first and second level cache.

The Profusion™ chip set 10 is connected to a first memory 13 (MEM I) and second memory 14 (MEM II). Additionally, the chip set 10 provides a cache coherency board 11 for the first group of processors (CPU's 1–4) on the first bus 15 and also provides for a second cache coherency board 12 which services the second group of processors (CPU's 5–8).

The Profusion™ chip set 10 connects on a bus 20 to four separate PCI buses designated 21, 22, 23, and 24. Each of these PCI buses will have a group of peripheral controllers connected to them such as 31–32, 33–34, 35–36, and 37 thru 40. These peripheral controller units would encompass such things as network interface cards, disk controller units, tape controller units, and so on.

Cache line sharing or data sharing (also called "false sharing") occurs when two separate threads are executing on two separate processors (CPU's) at the same time and are "updating" separate data that happens to be declared in the same area of the same array in memory.

The coherency of the cache lines needs to be maintained across the two different processors (CPU's). The amount of time (elapsed time, as measured by calling the Windows NT Function Query Performance Counter) will be longer if the two CPU's involved are located on different busses. However, if the two CPU's are on the same bus, then the time for establishing data coherency will be much shorter.

Figure 2A:
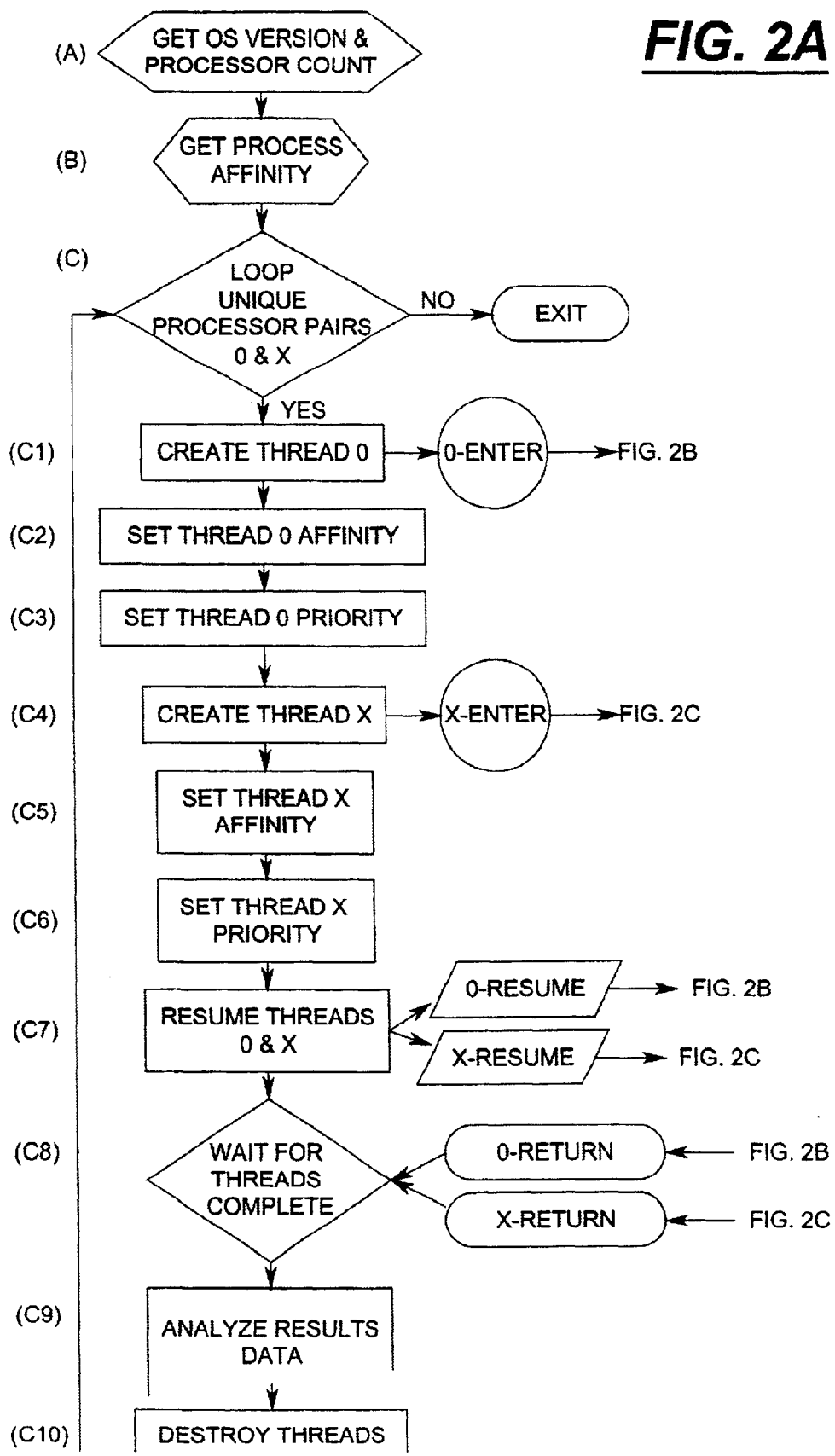
FIG. 2A is a generalized flowchart showing the set of steps used for analyzing the operative factors in the system network in order to enable analysis of thread operations.
Figure 2B:
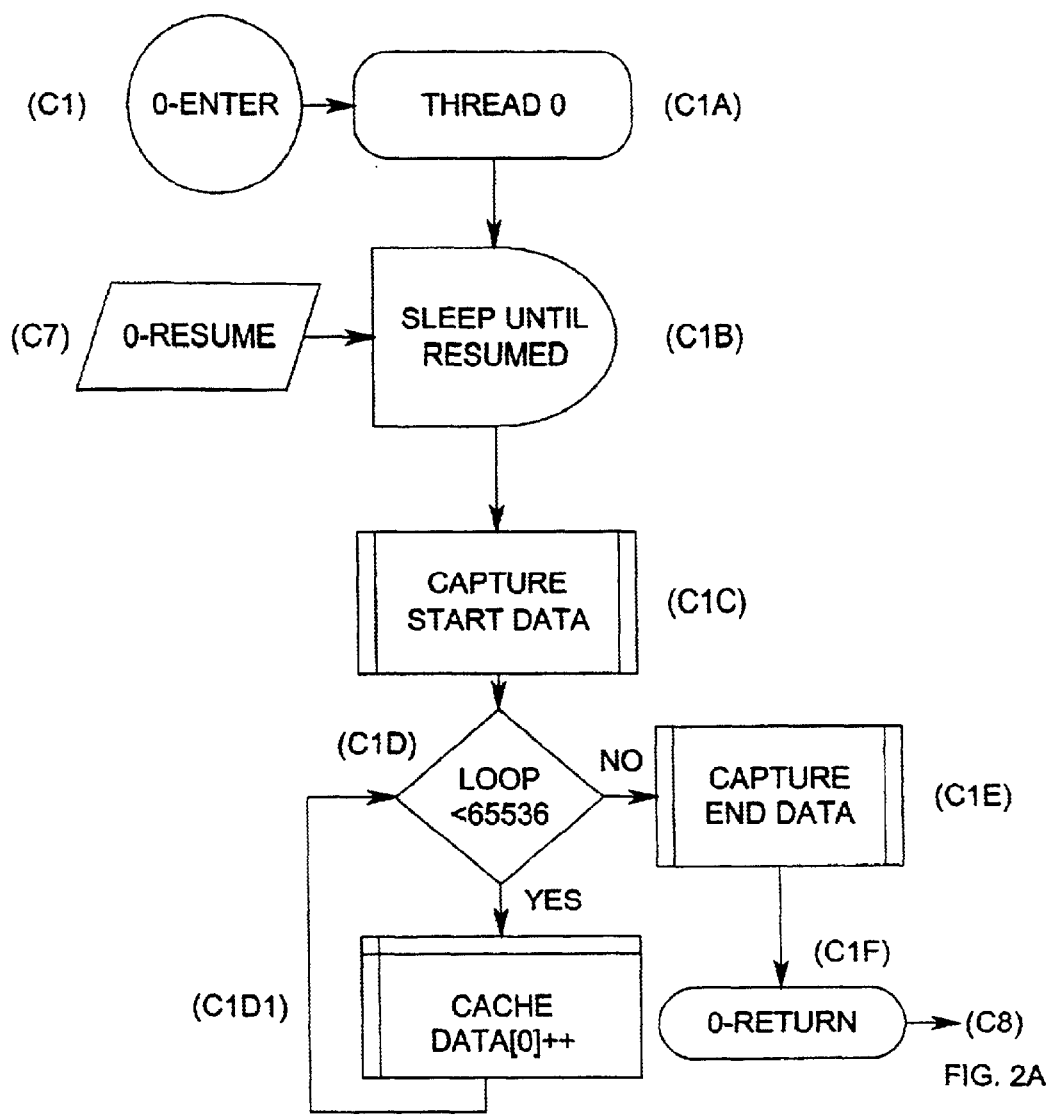
FIG. 2B is a flowchart illustrating the "0" interleg of FIG. 2A.
Figure 2C:
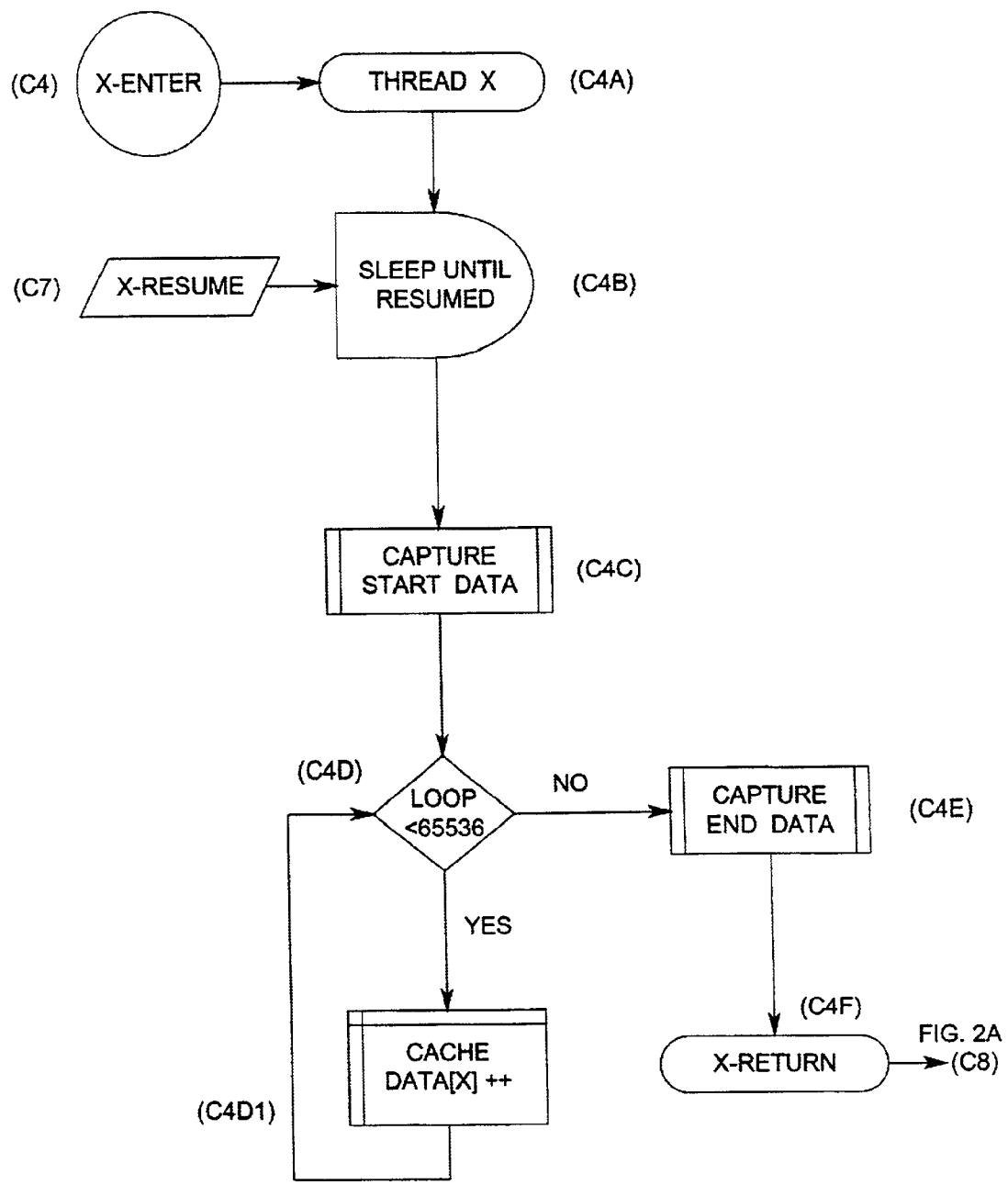
FIG. 2C is a flowchart illustrating the "X" interleg of FIG. 2A.

OPERATIONAL FUNCTIONS:

FIGS. 2A, 2B, and 2C will illustrate, in flowchart form, the operational steps involved in establishing which particular processor is operating with which of the multiple busses in order to then later properly allow the balance of bus activities so that processor operations will not overburden any one particular bus.

First referring to FIG. 2A, there is seen a sequence of steps A, B, C, then C1 through C10. The branch at C1 continues out to FIG. 2B, and another branch at C4 continues out to FIG. 2C. Then step C7 fans out in one case to FIG. 2B and in another case to FIG. 2C.

Initially in FIG. 2A, it will be seen that there are certain return sequences from FIGS. 2B and 2C which feed back into step C8 of FIG. 2A.

At step A, (FIG. 2A) there is an initiation of the program. The first action is to obtain information about the system upon which the particular program is executing. Of particular note, is the: (i) version of the Operating System, and (ii) also the number of processors involved (processor count). The Operating System information is for reporting purposes only. The number of processors involved is used to determine the number of times that each of the individual threads 0 and X (shown in FIGS. 2B and 2C) need to be executed. For example, if there are 8 processors in the system connected to two separate busses, then a certain number of pair combinations of any two of the available processors can be placed together in order to proceed for 8 factorial situations which would then include all the possible pair combinations that could occur with the 8 processors.

At step B of FIG. 2A, the sequence will obtain the "affinity mask" for running program. This is information which allows the program to determine the range of valid processors or which pair of processors, the program has been given access to. The threads 0 and X (shown in FIGS. 2B and 2C) will then be executed only on those two selected processors at that given time cycle.

At step C, this constitutes the start of the main loop. This loop is executed for each possible pairing of processors on the system. The number of times that this loop will be executed depends on the number of processors available on the system as was determined in step A, which would then indicate the number of all possible pairs of processor which could be selected.

The next sequential step is step C1 which indicates the creation of thread "0" (zero). This is creating the first thread and this starts the first thread of FIG. 2B shown as the circle "0-ENTER".

At this point, the sequence proceeds to FIG. 2B where at step C1A the first thread "0" is begun for execution. Then at step C1B, a period of sleep occurs until the signal from (C7) designated 0-RESUME, occurs to resume the operation. During the sleep period, he thread is ready and waiting to be allowed to execute on the CPU.

At step C1C, the clock information is captured before the start of the loop and then stored in main memory. This is followed by step C1D where a loop occurs for 100,000 occurrences, whereupon the cached data items are updated, forcing the coherency of the cache lines in the two CUP's to be resolved. This cache data involves the thread "0"and the sequence loops back to step C1D which queues and indicates that the loop is no longer less than 65,536 iterations, at which time at step C1E, the end data is captured in memory and then proceeds to step C1F which is the 0-return point back to FIG. 2A at C8.

Now returning to FIG. 2A, the next sequential step involves step C2 which is a setting of the thread 0 affinity. Here, there is a setting of the affinity mask of the first thread (thread 0) to the first processor to be tested. The affinity mask presents information allowing a program to determine which processor, or pair of processors, the program has been given access to. The affinity mask is described in the Glossary.

At step C3, the system then sets the priority of the first thread (thread 0) to the highest level available. The Kernel operation is called with a request to assign the highest (real time) priority to the thread.

Then at step C4, (FIG. 2C) the second thread is created as seen at the point X-ENTER, which starts the thread in FIG. 2C, whereupon there is an execution of steps C4A through C4F. Thus at step C4A, there is the beginning of the second thread, thread X. The next step is step C4B where the operation sleeps until it is resumed by a signal from C7 (X-RESUME).

At step C4C, there is a capture (from the start data) of further clock information for the start of the loop for data to be stored in the main memory. Then step C4D is a loop query to enable multiple iterations for update of stored data in cache memory until more than 65,536 iterations are accomplished whereupon at No, then step C4E ends the capture of clock information for the end of the loop. Then at step C4F, the X-RETURN sequence occurs for return to the main process of step C8 of FIG. 2A.

Now returning to FIG. 2A, at step C8 there is a decision block on waiting for the threads to complete. It will be seen that a return at C8 can occur on the first thread (thread 0) from FIG. 2B and a return can be received from FIG. 2C for the second thread (thread X).

Then at step C9, an analysis occurs by writing the thread pair CPU numbers, and additionally writing the beginning and ending times captured by the two threads in FIGS. 2B and 2C from main memory over to a data file on disk where these beginning and ending times of the two selected threads can be analyzed by a computer systems analyst. This will enable the analyst to then determine which particular processor is operating on which particular one of the multiple busses.

This analysis will show certain CPU pairs as taking much longer operating time cycles as shorter time cycles. Thus, those pairs of CPU's with the short time operating cycles are the CPU's which are "affinitized" to the same bus for their operating cycles.

This will then enable the operator of the system to create a more equitable load balancing between the multiple processors and the multiple busses.

Then at step C10, the two threads are eliminated or destroyed. After this, operations are closed and the information is saved on the data file on the disk and then the entire program is ended or closed.

The results will show that some pairs of processors will have short time cycles. For example, all processor pairings for processors 0, 5, 6 and 7 could have short time cycles. Load balancing can then be performed by using a program to set the affinity of some processes to use processors from this list. Another set of processes can be given an affinity mask of processors from the set of 1, 2, 3 and 4. This load balancing will ensure that the processes make optimum use of the caches for this particular configuration.

Described herein has been a method for determining which particular processors reside on the same bus in multiple CPU systems operating on several different busses. Affinity management is developed to determine which processor or group of processors a particular application is allowed to use. In order to minimize the unwanted effects of caching overhead operations and consequent performance penalties when two separate threads are executing on two separate processors at the same time and involving the same area of cache memory, a method is utilized for timing the cache invalidation operations for all possible combinations of pairs of processors utilizing first one bus and then the other. From this analysis, it is then possible to determine which processor is utilizing which one of the busses involved. Then this permits load balancing so that the execution of applications can be distributed more evenly across both busses. This then enables more efficient operations and throughput.

While one preferred embodiment has been described, other implementations of the invention may be utilized but are still defined by the attached claims.

What is claimed is:

1. A method for determining the affinity of each pair of processors in a multiple processor-multiple bus network where each processor has its own cache memory, comprising the steps of:

(a) exercising each and every pair of processors within the total group of processors to execute a cache update cycle;

(b) identifying those pairs of processors which indicate a minimal time elapsed for completion of said cache update cycle.

2. The method of claim 1 wherein step (a) for exercising each and every pair of processors further includes the steps of:

(a1) utilizing a thread 0 for execution on a first processor of said selected pair;

(a2) utilizing a thread X for execution on the second processor of a selected pair.

3. The method of claim 2 wherein step (b) includes the steps of:

(b1) recording the elapsed time for completion of said thread 0;

(b2) recording the elapsed time for completion of said thread X.

4. A method for eliminating cache coherency overhead and enhancing throughput in a multi-processor system using multiple busses where a first group of processors utilize a first bus and a second group of processors utilize a second bus, comprising the steps of:

(a) selecting a pair (x,y) of processors from among said first and second groups to respectively run up dating separation threads 0 and X through each the cache memory unit of said respectively selected pairs of processors;

(b) recording the time involved to accomplish each updating operations for each selected pair of processors (x,y);

(c) running pairs of processors (x,y) which are selected to pair-off each possible combination of processor pairs from the entire group of processors totaling the sum of said first and second groups;

(d) recording the time involved for each and every one of said combination of processor pairs in accomplishing their cache updating threads;

(e) identifying those processor pairs (x,y) having the short time cycles for cache updating as those processors having an affinity to a particular bus.

5. A system for determining the affinity between processor pairs and one of two available processor busses in a multiple-processor, multiple bus digital network comprising:
- (a) means to exercise each possible combination of processor pairs for accomplishing a cache update cycle;
- (b) means for recording the elapsed time for each pairs' cache update cycle completion;
- (c) means for identifying those processor pairs having the minimal cache cycle completion times.

6. The system of 5 which includes:
- (d) means for utilizing only those processor pairs indicating minimal cache cycle completion times.

7. The system of claim 5 wherein said means (a) to exercise further includes:
- (a1) means to enter a thread 0 into a first processor of a selected pair;
- (a2) means to enter a thread X in said second processor of said selected pair.

8. The system of claim 7 wherein said means (b) for recording further includes;
- (b1) means for clocking the start time and stop time for execution of said thread 0;
- (b2) means for clocking the start time and stop time for execution of thread X.

9. The system of claim 8 wherein said means (c) for identifying further includes:
- (c1) means for recording data regarding the elapsed time for executing said cache update cycles for each pair of processors of the multi-procsessor network.

* * * * *